United States Patent [19]
Lustig et al.

[11] Patent Number: 5,337,015
[45] Date of Patent: Aug. 9, 1994

[54] IN-SITU ENDPOINT DETECTION METHOD AND APPARATUS FOR CHEMICAL-MECHANICAL POLISHING USING LOW AMPLITUDE INPUT VOLTAGE

[75] Inventors: Naftali E. Lustig, Croton on Hudson; Randall M. Feenstra, Mt. Kisco; William L. Guthrie, Hopewell Junction, all of N.Y.

[73] Assignee: International Business Machines Corporation, Armonk, N.Y.

[21] Appl. No.: 75,628

[22] Filed: Jun. 14, 1993

[51] Int. Cl.$^5$ ............................................. G01R 27/26
[52] U.S. Cl. ........................................ 324/671; 324/688; 156/627; 437/8
[58] Field of Search ............ 156/627; 324/71.1, 158 F, 324/671, 679, 687, 688, 690; 437/8

[56] References Cited

U.S. PATENT DOCUMENTS

| | | | |
|---|---|---|---|
| 2,285,152 | 6/1942 | Firestone | 175/183 |
| 3,826,979 | 7/1974 | Steinmann | 324/688 |
| 4,087,672 | 5/1978 | Yi | 219/121 LM |
| 4,266,187 | 5/1981 | Slough | 324/65 C |
| 4,407,094 | 10/1983 | Bennett et al. | 51/165 R |
| 4,476,430 | 10/1984 | Wright et al. | 324/61 R |
| 4,652,830 | 3/1987 | Brown | 324/439 |
| 4,751,466 | 6/1988 | Colvin et al. | 324/449 |
| 4,793,895 | 12/1988 | Kaanta et al. | 156/627 |
| 4,845,421 | 7/1989 | Howarth et al. | 324/683 |
| 5,025,220 | 6/1991 | Colvin et al. | 324/449 |
| 5,030,918 | 7/1991 | Thon | 324/671 |
| 5,081,421 | 1/1992 | Miller et al. | 324/671 |
| 5,136,817 | 8/1992 | Tabata et al. | 51/165.71 |

*Primary Examiner*—Kenneth A. Wieder
*Assistant Examiner*—Christopher M. Tobin
*Attorney, Agent, or Firm*—Michael J. Balconi-Lamica

[57] ABSTRACT

An in-situ thickness monitoring/endpoint detection method and apparatus for chemical-mechanical polishing (CMP) of a dielectric layer on a top surface of a semiconductor wafer is disclosed. The apparatus comprises center and guard electrodes and associated electronic circuitry, including a high frequency, low voltage signal generating means, for converting a current which is inversely proportional to the dielectric layer thickness into a corresponding analog voltage. A position detection device triggers an analog-to-digital converter to convert the analog voltage into a digital signal while the wafer is located within a detection region as the wafer is being polished. A control means gathers the digital signals corresponding to the thickness data for processing and CMP device control.

21 Claims, 7 Drawing Sheets

IN-SITU ENDPOINT DETECTION METHOD AND APPARATUS FOR CHEMICAL-MECHANICAL POLISHING USING LOW AMPLITUDE INPUT VOLTAGE

BACKGROUND OF THE INVENTION

1. Field of the Invention

This invention relates to a method and apparatus for use determining a planarization endpoint, during a chemical-mechanical polishing process, of a semiconductor wafer.

2. Discussion of the Related Art

In VLSI wiring technology, connecting metal lines are formed over a substrate containing device circuitry. These metal lines serve to electrically interconnect the discrete devices. These metal connecting lines are further insulated from the next interconnection level by thin films of insulating material formed by, for example, chemical vapor deposition (CVD) of oxide. In order to interconnect metal lines of different interconnection levels, holes are formed in the insulating layers to provide electrical access therebetween.

In such wiring processes, it is desirable that the insulating layers have a smooth surface topography, because rough surfaces cause fabrication problems. More specifically, it is difficult to image and pattern layers applied to rough surfaces, and this difficulty increases as the number of layers increases.

Recently chemical-mechanical (chem-mech) polishing (CMP) has been developed for providing smooth insulator topographies. CMP includes the use of polishing machines and other chemical-mechanical planarization processes. In these processes, it is important to remove a sufficient amount of material to provide a smooth surface, without removing an excessive amount of underlying materials. Thus, a precise etch endpoint detection technique is needed.

Presently, there are various types of lapping machines for reducing the thickness of semiconductor wafers. In general, these lapping machines include top and bottom lapping plates, between which the wafers are positioned. The two lapping plates are then moved relative to each other, and a slurry, consisting of an abrasive solution with or without an etching reagent, is fed between the plates to grind and flush away ground wafer particles. While lapping is typically associated with bulk removal of material from a wafer surface, chemical-mechanical polishing refers to polishing of thin films rather than bare wafers. In chemical-mechanical polishing, the slurry is fed between the lapping or polishing plates to polish and flush away the material removed. A chemical-mechanical polishing machine can include a single rotating polishing plate and a smaller diameter rotating wafer carrier to which a wafer (or wafers) is (are) mounted. The wafer carrier is held above the polishing plate, either in a stationary fixed position or oscillating back and forth in a predetermined path, while both polishing plate and wafer carrier are rotated about their respective center axes. A slurry, consisting of an abrasive suspension with or without an etching reagent, is fed onto the polishing plate during polishing of the wafer.

Figure 1A:
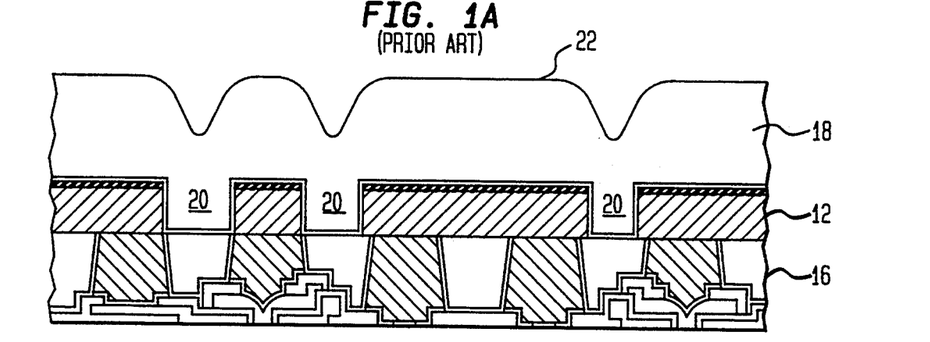
FIGS. 1(a)-(d) are schematic representations of VLSI wiring fabrication, including a thick dielectric layer upon a semiconductor wafer.
Figure 1B:
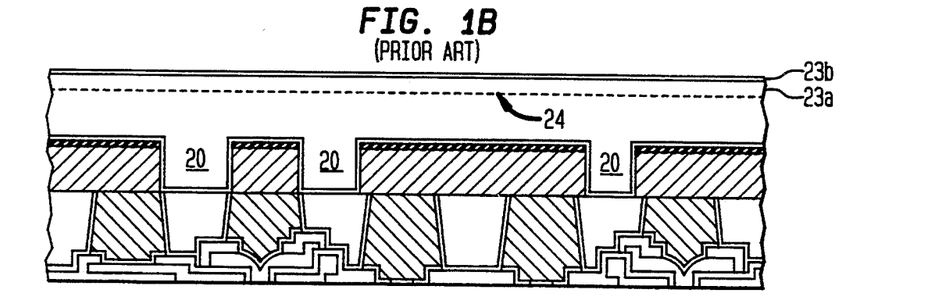
Figure 1C:
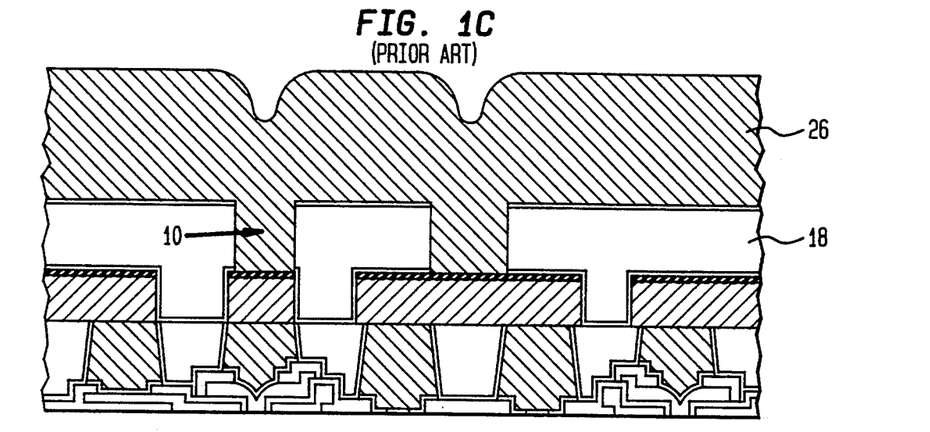
Figure 1D:
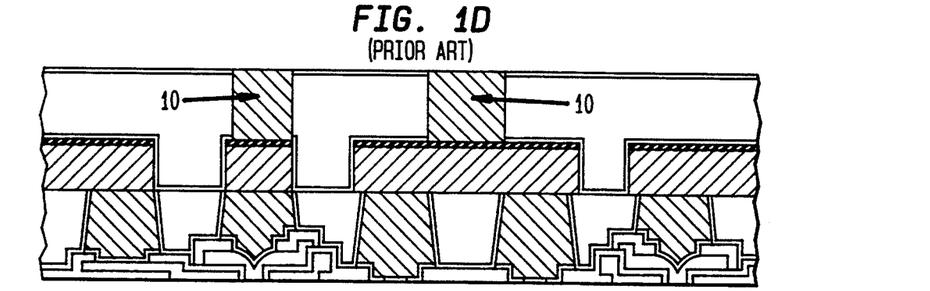

FIG. 1 shows an example of the formation of an interlevel contact stud 10 (FIG. 1(d)) between a first level metalization 12 and a second level metalization (not shown) in a high performance VLSI circuit 16. An interlevel dielectric 18 is deposited so as to conformally coat a lower level pattern 12 and fill gaps 20 between metallic lines 12. A rough surface 22 results which needs to be planarized prior to the next photoresist image being formed. Planarization is achieved upon polishing back a desired amount using CMP as indicated by the dotted line 24 in FIG. 1(b). The planarization is a consequence of using a polishing pad of an appropriate stiffness which transmits a higher pressure to the more elevated areas, thereby removing them more efficiently. Thin $SiO_2$ and $SiN_x$ "cap" layers, 23a and 23b, respectively, are then deposited. Following via formation by reactive ion etching, a metalization layer 26 is blanket deposited (FIG. 1(c)). The metalization layer 26 is selectively polished back to produce planar metal studs 10 as shown in FIG. 1(d). A persistent difficulty in this process is the inability to determine when the required thickness 24 or endpoint has been reached during the first dielectric polishing step. One method of determining the required thickness or CMP endpoint is by using estimated CMP rates and time. CMP rates vary considerably with time, however, due to changes in polishing pad characteristics. Frequent stops are required in the fabrication process for ex-situ thickness measurements. This method is extremely time consuming and highly undesirable since operators must inspect each wafer after polish. Process throughput is thereby reduced and product yields are lowered. A more precise CMP endpoint detection method and apparatus is desired. In addition., while an endpoint for the second polishing step (metalization layer polish) can be achieved by inspection and observation of the blanket to patterned layer transition, automated endpoint detection would also be highly desirable.

An in-situ CMP endpoint determination method and apparatus is shown in U.S. Pat. No. 5,081,421, issued Jan. 14, 1992 and assigned to AT&T Bell Laboratories. In the '421 patent, the in-situ endpoint determination is based on a measurement of a voltage required to maintain a fixed current flow through a structure under polish. The voltage decreases linearly with the thickness of the dielectric. A disadvantage of the '421 patent endpoint CMP detector is its inability to provide endpoint measurement for polishing table speeds in excess of 20 to 25 rpm's for 5" wafers, such as 60 rpm, which are typical in many polishing applications wherein the maximum rpm is a function of wafer size. Another disadvantage of the '421 device is that it requires relatively high voltage operation (approximately 3 to 5 volts) which is incompatible for use in VLSI fabrication of low voltage (i.e., less than one-half volt) silicon junction devices.

In addition to the above-noted characteristics of CMP, removal uniformity can change during polishing of a wafer as a result of changes in pad and wafer carrier conditions. Detection of abnormal removal uniformity or spurious changes therein is therefore highly desirable, i.e., a method and apparatus for in-situ detection and monitoring of removal uniformity.

Thus, there remains a continuing need in the semiconductor fabrication art for an apparatus and method which accurately and efficiently detects and monitors polishing characteristics of a chemical-mechanical planarization process. A fast response time, low voltage device is highly desired.

SUMMARY OF THE INVENTION

An object of the present invention is to provide a low voltage CMP thickness monitor/endpoint detection method and apparatus.

Another object of the present invention is to provide a method and apparatus for CMP thickness monitoring/endpoint detection operable over a wide range of polishing table speeds such as low polishing table speeds of 20-25 rpm to polishing table speeds in excess of 20-25 rpm.

Yet another object of the present invention is to provide a method and apparatus for in-situ removal uniformity detection.

According to the invention, an in-situ thickness monitoring/endpoint detection method and apparatus for monitoring the thickness of a dielectric film layer on a surface of a workpiece during polishing in a polishing machine, the polishing machine having an electrically grounded rotatable polishing table and further being provided with a conductive slurry, comprises the following: A center electrode is embedded within and electrically isolated from the polishing table of the polishing machine, wherein the center electrode electrically contacts the workpiece via the conductive polishing slurry. At least one guard electrode is embedded within and electrically isolated from the polishing table of the polishing machine and from the center electrode, wherein the at least one guard electrode is concentric with and surrounding the center electrode and further wherein the at least one guard electrode electrically contacts the workpiece via the conductive polishing slurry. A sinusoidal voltage signal generating means provides an output signal having a frequency in the range of 500 to 50,000 hertz and an amplitude of less than one-half volt. A voltage follower, having an input and an output, is electrically connected at its input to the output of the signal generating means and further connected at its output to the at least one guard electrode. A current-to-voltage converter, having first and second inputs and an output, is electrically connected at its first input to the center electrode and at its second input to the output of the signal generating means, wherein the current-to-voltage converter converts a current flowing through the center electrode into a voltage signal. A differential amplifier, having first and second inputs, is electrically connected at its first input to the output of the current-to-voltage converter and at its second input to the output of the signal generating means. The differential amplifier further comprises an output for providing an output voltage representative of the current flowing through the center electrode, whereby the amplitude of the differential amplifier output voltage is inversely proportional to the thickness of the film layer of the workpiece being polished when the workpiece being polished is within a detection region.

DETAILED DESCRIPTION OF THE PREFERRED EMBODIMENTS

The invention is disclosed in connection with a chem-mech polishing apparatus or lapping machine. Because chem-mech polishing apparatus and lapping machines are well known, this description is directed in particular to elements of chem-mech polishing apparatus forming part of or cooperating directly with the invention. It is to be understood, however, that other elements not specifically shown or described may take various forms known to persons of ordinary skill in the art.

Figure 2:
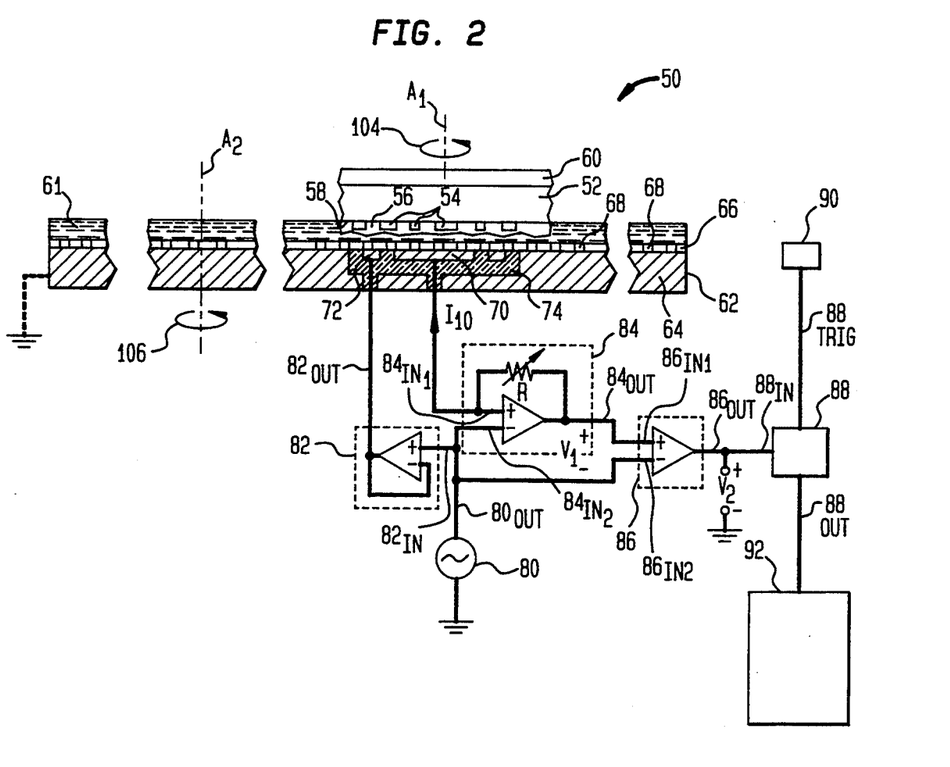
FIG. 2 is a schematic representation of the apparatus of the present invention.

Referring now to FIG. 2, an apparatus 50 for chem-mech polishing a semiconductor wafer 52 having metal lines, contact/via studs, and/or pads 54 is shown. A thick dielectric layer 56, comprising for example silicon dioxide, overlies the metal lines 54 and the remainder of surface 58 of semiconductor wafer 52. It should be noted that semiconductor wafer 52 may have been pre-processed and therefore already include layers of interleaved circuitry. For simplicity, those other features are not represented in FIG. 2.

Apparatus 50 may comprise any commercially available chem-mech polishing apparatus, such as, a Strasbaugh 6CA single wafer polisher available from R. Howard Strasbaugh Inc. of Huntington Beach, Calif. Apparatus 50 includes a wafer carrier or holder 60 having a suitable means for securing wafer 52 thereto. As shown, wafer 52 is positioned between wafer carrier 60 and a polishing table 62. Wafer carrier 60 is mounted by suitable means above polishing table 62 for rotation about axis $A_1$ in a direction indicated by arrow 104. The polishing table 62 includes a conductive platen 64 and a polishing pad 66 having holes 68 formed therein. Conductive platen 64 is electrically grounded by suitable means. Furthermore, polishing table 62 rotates about axis $A_2$ in a direction indicated by arrow 106. A conductive polishing slurry 61 is provided also.

Figure 3:
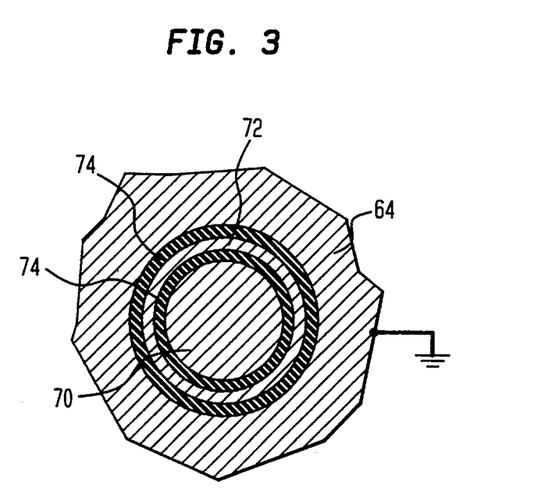
FIG. 3 is a top view of center and guard electrodes, according to the present invention, embedded within the polishing table.

Referring now to FIGS. 2 and 3, according to the present invention, a thickness monitoring/endpoint detection apparatus 40 comprises a conductive center electrode 70 and at least one conductive guard electrode 72 embedded within platen 64. Conductive center electrode 70 comprises an active electrode, to be discussed supra. The at least one guard electrode 72 is concentric with center electrode 70 and comprises a passive electrode, to be discussed supra, also. While only one guard electrode 72 is shown, more than one may be included. An insulator 74, comprising teflon, for example, electrically isolates electrodes 70 and 72 from one another and from conductive platen 64.

Referring again to FIG. 2, the thickness monitoring/endpoint detection apparatus 40 of the present invention further comprises a signal generator means 80 having an output $80_{out}$ for providing an output signal having a frequency in the range of 500 to 50,000 hertz and an amplitude of less than one-half volt. Signal generating means 80 comprises any suitable means for providing the desired output signal. A voltage follower 82, having an input $82_{in}$ and an output $82_{out}$, is electrically connected at the voltage follower input $82_{in}$ to the output $80_{out}$ of the signal generating means 80. The voltage follower output $82_{out}$ is electrically connected to the at least one guard electrode 72 by suitable means, such as a slip-ring assembly (not shown), for example. Voltage follower 82 prevents undesired loading of signal generating means 80.

A current-to-voltage converter 84 having first and second inputs, $84_{in1}$ and $84_{in2}$, respectively, and an output $84_{out}$, is electrically connected to center electrode 70 by suitable means, such as a slip-ring assembly (not shown), for example. Second input $84_{in2}$ is electrically connected to the output $80_{out}$ of signal generating means 80. Current-to-voltage converter 84 converts a current $I_{10}$ flowing through the center electrode 70 into a voltage signal at output $84_{out}$ when apparatus 40 is active. The gain current-to-voltage converter 84 is controlled by the value of feedback resistance R connected between input $84_{in}$ and output $84_{out}$.

A differential amplifier 86, having first and second inputs, $86_{in1}$ and $86_{in2}$, respectively, is electrically connected at first input $86_{in1}$ to the output $84_{out}$ of current-to-voltage converter 84. Second input $86_{in2}$ of differential amplifier 86 is electrically connected to the output $80_{out}$ of signal generating means 80. Differential amplifier 86 further provides an output voltage on output $86_{out}$, the output voltage being representative of the current $I_{10}$ flowing through center electrode 70. Differential amplifier 86 serves to subtract out that portion of the voltage signal contained in the output $84_{out}$ which is attributable to the signal generating means voltage.

Referring still to FIG. 2, an analog-to-digital converter (ADC) 88 comprises any suitable ADC, having signal input channel $88_{in}$, a trigger input channel $88_{TRIG}$, and digital output $88_{out}$. Input channel $88_{in}$ is electrically connected to differential amplifier 86 output $86_{out}$, for receiving the voltage representative of the current $I_{10}$ flowing through center electrode 70. Trigger input $88_{TRIG}$ is electrically connected to a position detection device 90. Position detection device 90 can comprise any suitable means for providing a signal indicative of a preestablished positional relationship between the wafer carrier 60 (and thus the wafer 52 being polished) and the electrodes 70 and 72 (to be discussed further hereafter below with reference to a detection region). A trigger signal received by trigger input $88_{TRIG}$ instructs ADC 88 to convert the analog voltage appearing at input $88_{in}$ to a digital signal on output $88_{out}$. Output $88_{out}$ is electrically connected to input $92_{in}$ of control means 92. Control means 92 can comprise, for example, any suitable programmable computer, the control means 92 for receiving digital signals and converting the same into a cognizable form for use by an operator of the CMP apparatus or for automatic control purposes. For example, control means 92 may include a display means for real-time display of thickness data during the polishing of wafer 52 by CMP apparatus 50. Preferably, the thickness data is determined from a change in voltage during polishing from an initial voltage at the beginning of the polishing operation for a particular wafer. This change in voltage corresponds to a given thickness and is the parameter of importance.

Figure 4:
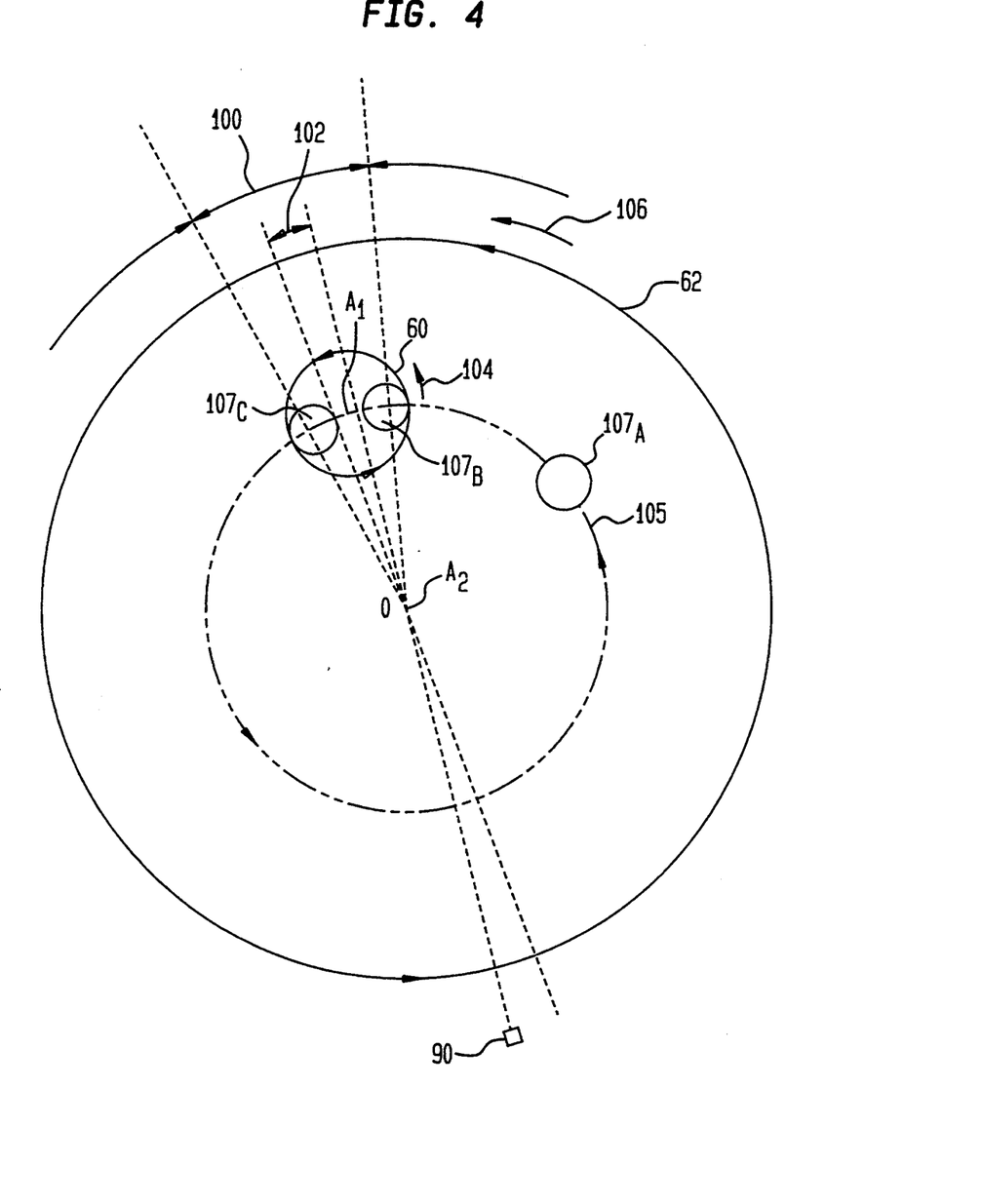
FIG. 4 is a schematic top view representation of the detection region for taking measurements of the dielectric layer thickness during each revolution of the polishing table.

Turning now to FIG. 4, a schematic top view representation of the above-mentioned detection region 100 is shown. Detection region 100 is that region defined by the positional relationship between the wafer holder or carrier 60 and electrodes 70 and 72 in which electrodes 70 and 72 are positioned below wafer carrier 60 during polishing. Position detection device 90 is used to detect and indicate when electrodes 70 and 72 are within the detection region. More particularly, position detection device 90 can detect a desired portion 102 of detection region 100. Position detection device 90 preferably comprises any suitable sensing device for sensing position information. For instance, position information may include information which is coded on an outer edge portion of polishing table 62. In other words, the position information encoded on the table 62 enables position detection device 90 to output a trigger signal when electrodes 70 and 72 are within detection region 100 or at some desired position or positions within detection region 100, such as portion 102. Position encoders are well known in the art and thus not further described herein. Alternatively, position detection device 90 may comprise a position sensing switch and a time delay, such that upon detection of electrodes 70 and 72 attaining a prescribed position along their path of travel, an output signal is generated for a desired time. In this later instance, the desired time would correspond to an amount of travel of electrodes 70 and 72 along their path of travel as a function of the rotational speed of table 62.

Operation of the CMP thickness monitoring/endpoint detection apparatus 40 of the present invention will be discussed using the following example.

Wafer 52, comprising a 5" silicon wafer having a 2000 Å thick aluminum dot pattern thereon and further covered with a 2 μm silicon dioxide layer, is mounted onto wafer holder 60 and then placed above polishing table 62. Conductive slurry 61 is then added. In this example, conductive slurry 61 comprises an oxide slurry, such as commercially available Cab-O-Sperse SC-1 slurry diluted 5:1 in deionized (DI) water. (Cab-O-Sperse is a registered trademark of Cabot Corporation.) The oxide slurry should be highly conductive for a wide range of dilutions to allow for good electrical contact between the wafer 52 and electrodes 70 and 72.

Wafer holder 60 and polishing table 62 are then rotated in directions indicated by arrows 104 and 106, respectively. Typical holder 60 and table 62 speeds are (30 to 60) and 60 revolutions per minute (rpm), respectively.

From the capacitive nature of this system, the displacement current, $I_{10}$, and the associated output voltage, $V_2$, increase with time. $I_{10}(t)$ is inversely related to the thickness $d(t)$ of the polished dielectric 56 through the relationship:

$$I_{10}(t) = [w \epsilon A / d(t)] V_o \cos wt$$

where
w is the frequency of the applied sinusoidal voltage signal;
$\epsilon$ is the dielectric constant of the polished film;
A is the effective detector or electrode area; and
$V_o$ is the amplitude of the applied sinusoidal voltage.

Upon rotation of table 62, electrodes 70 and 72 traverse along a circular path 105, wherein three positions of electrodes 70 and 72 along path 105 are indicated by numerals $107_A$, $107_B$, and $107_C$ (FIG. 4). Electrodes 70 and 72 enter and exit detection region 100 as shown by positions $107_B$ and $107_C$, respectively. While within the detection region, the electrical circuit formed between the grounded polishing table 62, the wafer 52 being polished, and the center electrode 70 is completed and a current $I_{10}$ passes through the film stack 56 and back into the grounded polishing table 62. The current $I_{10}$ consists of a sinusoidal pulse whose pulse width depends upon the time spent by the rotating wafer 52 over the electrodes 70 and 72, i.e., the detection region can be viewed in terms of time. For the 5" wafer located at a 6.5" radius from axis $A_2$ and a table rotating speed of 60 rpm, this time corresponds to approximately 100 Msec. This time will be longer for larger wafer sizes and reduced table speeds. The current pulse is converted to a voltage pulse using the current-to-voltage converter 84. The output of current-to-voltage converter 84 is then inputed through amplifier 86 to ADC 88. ADC 88 converts the voltage and provides a digital output signal to control means 92 upon receipt of a trigger signal on trigger input $88_{TRIG}$. AS previously discussed, position detection device 90 provides a trigger signal when wafer 52 is within the detection region 100. Position detection device 90 can be controlled for providing a trigger signal for the entire detection region 100 or a portion 102 of detection region 100. Preferably, position detection device 90 is controlled to trigger ADC 88 when the electrodes 70 and 72 pass under the center portion of wafer 52, corresponding to portion 102 of detection region 100. For instance, for a 20 Khz sinusoidal voltage signal being output by signal generator 80, portion 102 of detection region 100 corresponds to a 1 to 10 Msec "snap-shot" of the output voltage $V_2$ which is digitized, and still further corresponding to 20 to 200 voltage signal wave oscillations. By selectively choosing the start of and the length of time sampled, transients in the voltage signal $V_2$ which are attributed to the electrodes 70 and 72 passing under the edge portions of wafer holder 62, are advantageously avoided. The trigger location and time window 102 are selected so as to allow a voltage pulse envelope comprising voltage signal wave oscillations to reach its full amplitude, thereby avoiding initial and final transients attributable to the edges of the wafer carrier 60 and wafer 52 as electrodes 70 and 72 enter and exit the detection region 100. The ADC digitized voltage signal is then sent to control means 92 for monitoring and processing, whereby voltage data, corresponding to dielectric layer 56 thickness, is collected as the wafer 52 is being polished. Upon attaining a desired thickness, the CMP apparatus is turned off and polishing is stopped.

Figure 5:
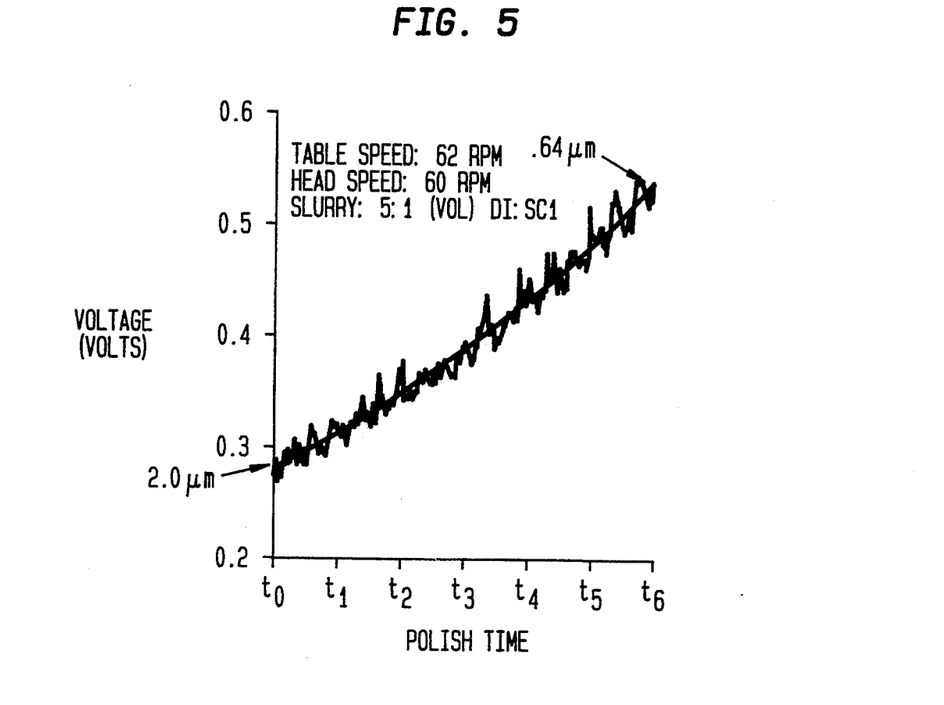
FIG. 5 shows a graph of time versus voltage for an $SiO_2/Al$ dots/Si wafer.

FIG. 5 is representative of an ADC digital output voltage vs. time corresponding to reduced oxide thickness. Such a graph is produced by control means 92 by suitable well known programming of control means 92, using commercially available software, for example, QBASIC, as sold by Microsoft Corporation of Redmond, Wash. In the example shown, a change in output voltage corresponding to 0.25 V corresponds to a removal of 1.36 $\mu$m of $SiO_2$. To verify this result, the oxide film 56 thickness was measured before and after polishing using a Prometrix 500 available from Prometrix Corporation of Santa Clara, Calif. The data points in the FIG. 5 were averaged over 3 revolutions (i.e., running average), thereby improving the signal-to-noise ratio. The noise component of the data, which was smoothed out considerably by this averaging procedure, is spike-like in nature. The remaining ripple ($\pm 0.022$ V) still seen in the signal most probably results from slurry shunt current which was not totally eliminated by the guard electrode. The solid line drawn through the data is obtained by a well known polynomial least square fit routine performed by control means 92.

Figure 6:
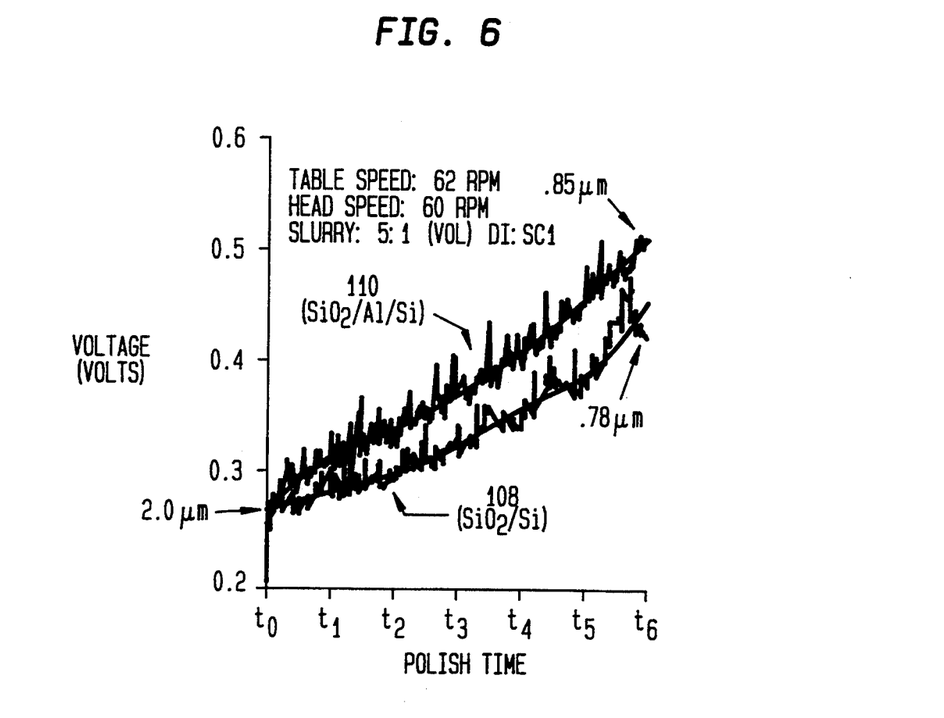
FIG. 6 shows a graph of time versus voltage for $SiO_2/Si$ and $SiO_2/Al/Si$ wafers.

The effects of polishing wafers, having various degrees of metal pattern coverage under an oxide layer, on the ADC 88 digital voltage output for oxide removals of approximately 1.2 $\mu$m from an initial 2.0 $\mu$m thickness are shown in FIG. 6. Curve 108 is representative of the output of CMP thickness monitoring/endpoint detection apparatus 40 upon the polishing of an $SiO_2$ film layer upon a Si wafer having zero percent metal coverage. Initial thickness of the $SiO_2$ film layer was 2.0 $\mu$m and at time $t_6$, the film layer thickness was 0.78 $\mu$m. Curve 110 is representative of the output of CMP thickness monitoring/endpoint detection apparatus 40 upon an aluminum layer (100% metal coverage) upon a Si wafer. Initial thickness of the $SiO_2$ film layer was 2.0 $\mu$m and at time $t_6$, the $SiO_2$ film layer thickness was 0.85 $\mu$m. Polishing parameters used for these latter two examples include a polishing table speed of 62 rpm, wafer holder speed of 60 rpm, and a polishing slurry of SC-1 diluted 5:1 in deionized water. The output from $SiO_2$/Al dots/Si for a similar change in thickness is intermediate between the two curves 108 and 110. This reduction of signal for a given change in thickness (i.e., sensitivity) is attributed to a larger contribution of the Si wafer impedance to the measurement than in the absence of any metalization. Also, these results suggest a procedure whereby the detector will be calibrated for every pattern and level to be polished. Once this calibration is performed a given change in voltage will correspond to the change in thickness for the given VLSI structure. However, as previously mentioned, it's the change in voltages for a given change in thickness which is the parameter of importance. It is noted that since the voltage monitored is the change between the initial and final voltages, changes in the initial absolute voltage are not expected to affect the measurements.

Figure 7:
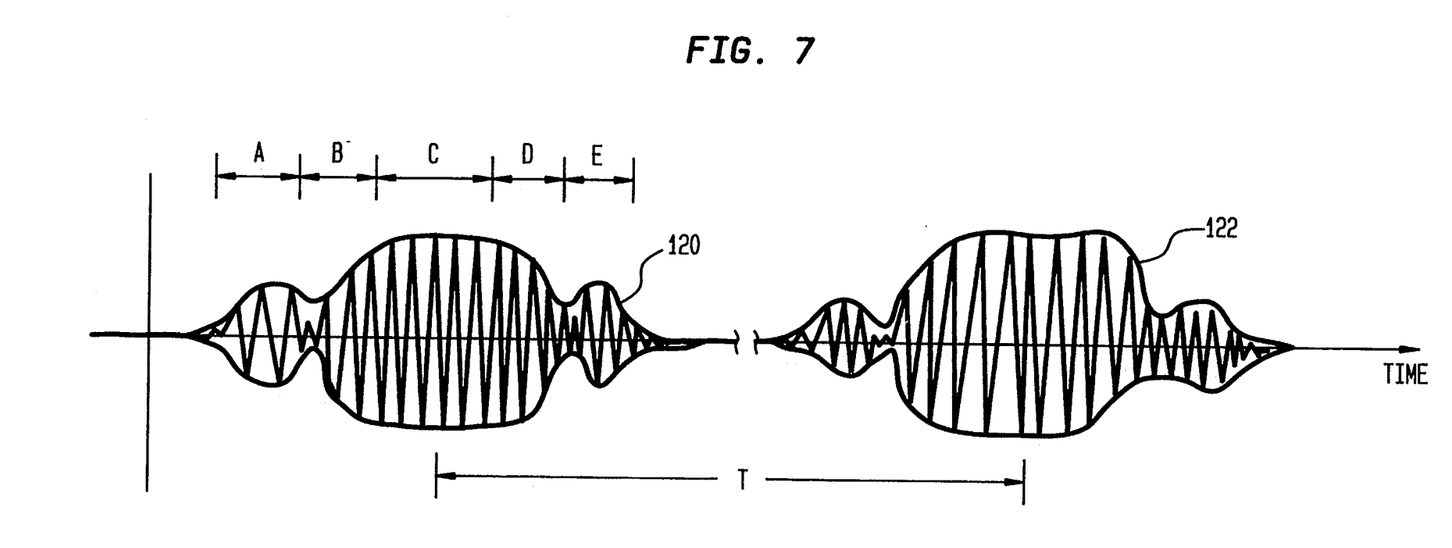
FIG. 7 shows a schematic representation of the detector signal.

Referring now to FIG. 7, the in-situ removal monitoring aspect of the present invention will be explained. A typical output signal is schematically represented which includes voltage pulse envelopes or wavepackets 120 and 122, respectively. Voltage pulse envelopes or wavepackets 120 and 122 are voltage signal envelopes obtained or produced at amplifier output $86_{out}$ for multiple passes of the detector electrodes 70 and 72 under wafer 52. The voltage signal envelopes or wavepackets 120 and 122 are separated in time by a time distance T between the wavepackets corresponding to the rotation period of the polishing table 62. Each wavepacket is characterized by five (5) different regions: region A is a pre-measurement signal region, region B is a rising transient signal region, region C is a steady state signal region, region D is a fall off transient region, and lastly, region E is a post measurement signal region.

Figure 8A:
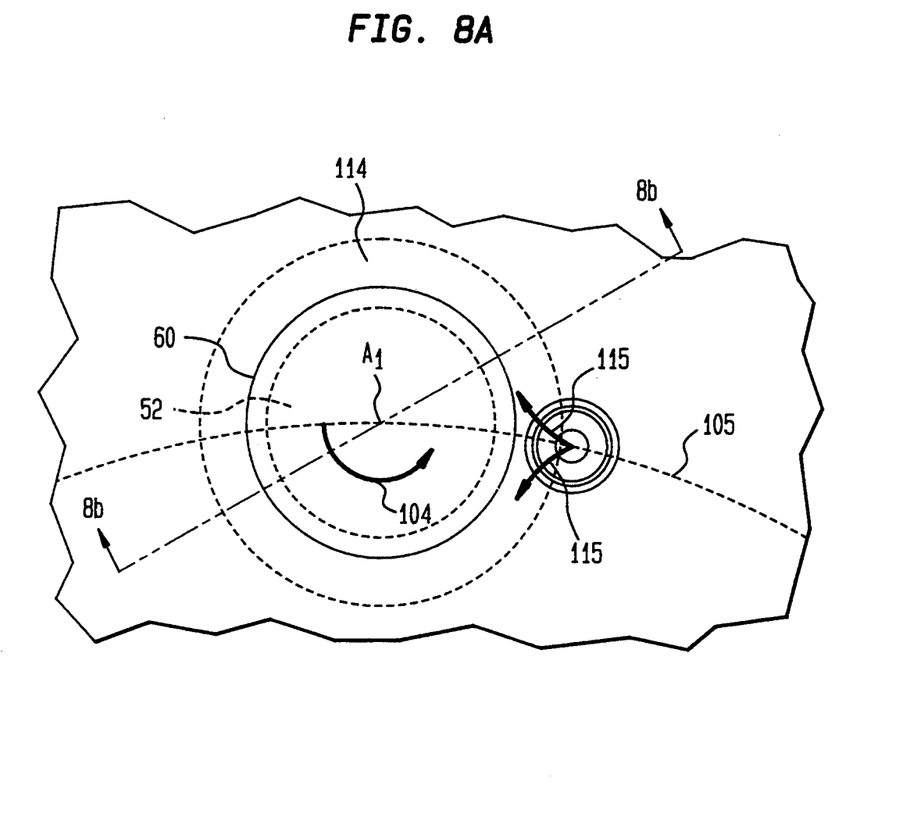
FIGS. 8a and 8b show top and side views, respectively, of the wafer carrier and the detector electrodes at a point in time during polishing of a wafer.
Figure 8B:
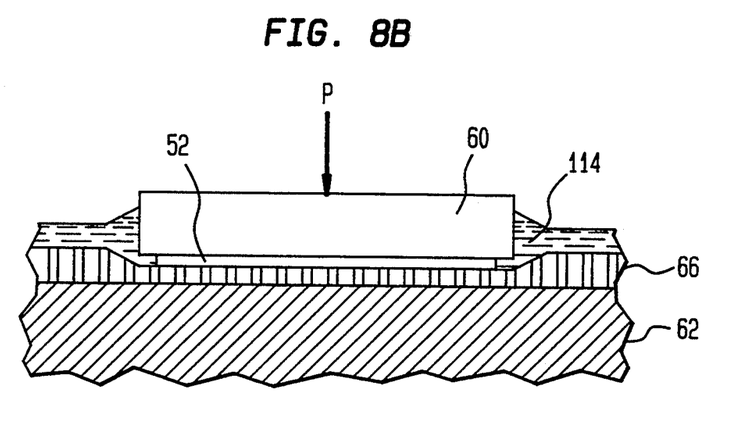

The magnitude of the pre- and post-measurement signals contained in regions A and E, respectively, have been found to be independent with time and therefore do not contain information about the dielectric film layer thickness of the wafer being polished. The signals contained in regions A and E are attributed to a current flowing through a pile-up or "pool" 114 of slurry which exists around the wafer carrier 60 (see FIGS. 8a and 8b). In other words, as electrodes 70 and 72 approach wafer carrier 60 along path 105, the electrodes enter the "pool" 114 of slurry 61. While the electrodes 70 and 72 are within the "pool" 114, the guarding scheme provided via guard electrode 72 and associated circuitry become ineffective and the center electrode 70 is essentially shorted to ground as illustrated by current flow lines 115 of FIG. 8a. The electrodes 70 and 72 clear the slurry "pool" 114 upon movement along path 105 when the electrodes move completely under wafer carrier 60, at which time, only a very thin layer of slurry is expected between the wafer and the electrodes. Regions B and D as shown in FIG. 7 correspond to the electrodes entering and leaving the area under the outer edge of wafer 52. Region C corresponds to the electrodes being completely under wafer 52 along path 105. It is within region C that the desired portion 102 of detection region 100 (FIG. 4) is selected. FIG. 8a shows a top view of wafer carrier 60 and electrodes 70 and 72 in relation to each other during one instant of a polishing operation. FIG. 8b is a sectional view of the wafer carrier 60 during polishing. A pressure P is exerted via the wafer carrier 60 upon polishing pad 66 causing a slight deformation therein. Creation of the slurry pool 114 is due in part to the deformation of pad 66 caused by contact with wafer carrier 60.

As indicated previously, dielectric layer thickness detection is facilitated by taking a "snap-shot" of voltage signal information when electrodes 70 and 72 pass under the center of wafer 52, i.e., around the middle of region C as shown in FIG. 7. In this manner, undesired transients as well as pre- and post-measurement signals are advantageously avoided.

Figure 9:
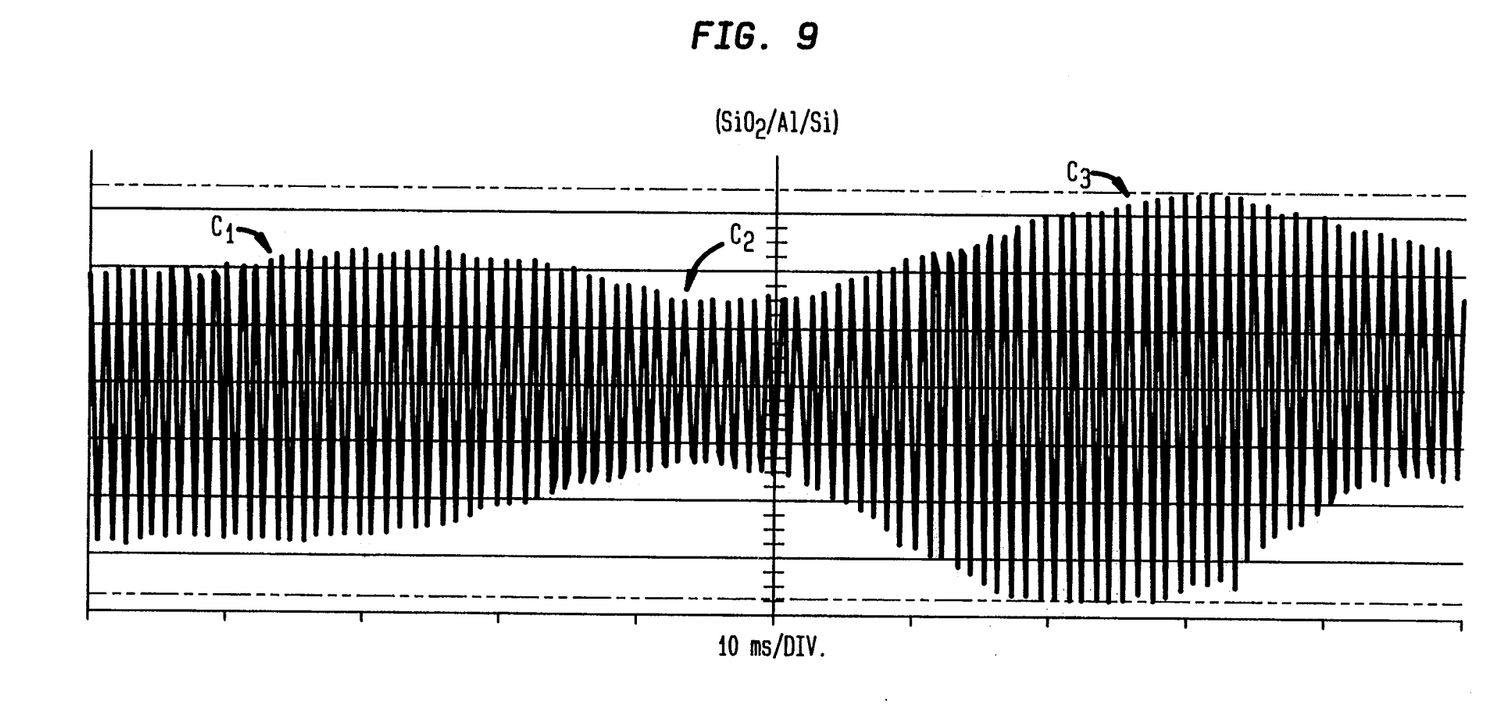
FIG. 9 shows the detector signal output during a portion of a single pass of the detector electrodes under a wafer being polished.

With respect to region C, different portions thereof correspond to thickness data from different locations across wafer 52. That is, the magnitude of the voltage signal is proportional to the dielectric layer thickness across wafer 52. Thus, by inspecting wavepacket 120 or any subsequent wavepacket, information about the removal uniformity can be obtained in-situ. In particular, the digitized voltage amplitudes across the wavepacket in region C are sent to control means 92 for quantitative analysis. The mean thickness and standard deviation across the desired area of region C is calculated in-situ and a decision regarding whether or not to proceed with the polishing operation is made. Determination of standard deviation and mean values can be by suitable methods known in the art. FIG. 9 shows a signal output representative of non-uniform polishing conditions wherein the thickness of the dielectric layer corresponding to C2 is smaller than at points corresponding to C1 and C3. Criteria, suitable for a particular polishing operation, can be established as appropriate for an acceptable in-situ non-uniformity set point, i.e., the point at which polishing is interrupted or terminated due to excessive in-situ non-uniform polishing.

There is thus provided a CMP thickness monitoring-/endpoint detection apparatus which provides fast response, real-time, low voltage operation. In-situ CMP removal uniformity monitoring and detection is provided also. Furthermore, the CMP thickness monitoring/endpoint detection apparatus of the present invention is suitable for use over a range of polishing table speeds from below 20 rpm to speeds well in excess of 20 rpm.

While the invention has been particularly shown and described with reference to the preferred embodiment thereof, it will be understood by those skilled in the art that various changes in form and detail may be made without departing from the spirit and scope of the invention.

What is claimed is:

1. An apparatus for monitoring the thickness of a dielectric film layer on a surface of a workpiece during polishing in a polishing machine, the polishing machine having an electrically grounded rotatable polishing table and further being provided with a conductive polishing slurry, said apparatus comprising:
   a) a center electrode embedded within and electrically isolated from the polishing table of the polishing machine, said center electrode electrically contacting the workpiece via the conductive polishing slurry;
   b) at least one guard electrode embedded within and electrically isolated from the polishing table of the polishing machine, said guard electrode being concentric with and surrounding said center electrode and further electrically contacting the workpiece via the conductive polishing slurry;
   c) means for generating a sinusoidal voltage signal, said signal generating means providing an output signal on an output thereof, the output signal having a frequency in the range of 500 to 50,000 hertz and an amplitude of less than one-half volt;
   d) a voltage follower having an input and an output, the voltage follower input being electrically connected to the output of said signal generating means and the voltage follower output being electrically connected to said guard electrode;
   e) a current-to-voltage converter having first and second inputs and an output, the first input being electrically connected to said center electrode and the second input being electrically connected to the output of said signal generating means, said current-to-voltage converter for converting a current passing through the center electrode into a voltage signal; and
   f) a differential amplifier having first and second inputs, the first input being electrically connected to the output of said current-to-voltage converter and the second input being electrically connected to the output of said signal generating means, said differential amplifier further having an output for providing an output voltage representative of the current passing through said center electrode, whereby the amplitude of the differential amplifier output voltage is inversely proportional to the thickness of the film layer of the workpiece being polished during movement of said center electrode and said at least one guard electrode through a detection region.

2. The apparatus of claim 1, further comprising
   g) an analog-to-digital converter means for converting the differential amplifier output voltage into a digital signal;
   h) means for triggering said analog-to-digital converter to convert the differential amplifier output voltage into digital signals as the workpiece is being polished, said triggering means triggering said analog-to-digital converter when said center electrode and said at least one guard electrode are within a prescribed portion of the detection region; and
   i) means for converting said digital signals into thickness data values corresponding to the thickness of the polished dielectric film layer.

3. The apparatus of claim 2, further wherein the prescribed portion of the detection region comprises a portion of the detection region characterized by said center electrode and said at least one guard electrode being positioned below a center portion of the workpiece during polishing.

4. The apparatus of claim 2, further wherein said digital signal converting means further comprises a means for averaging the thickness data values.

5. The apparatus of claim 4, wherein said digital signal converting means comprises a computer, the computer further having a display for displaying the averaged thickness data values in real-time.

6. The apparatus of claim 4, further wherein the prescribed portion of the detection region comprises a portion of the detection region characterized by said center electrode and said at least one guard electrode being positioned below a center portion of the workpiece during polishing.

7. The apparatus of claim 2, further wherein said digital signal converting means comprises a means for computing a mean thickness value and a standard deviation from thickness data values generated during each individual pass of said center electrode and said at least one guard electrode through the detection region.

8. The apparatus of claim 7, wherein said digital signal converting means comprises a computer, the computer further having a display for displaying the mean thickness value and the standard deviation in real-time.

9. The apparatus of claim 8, further wherein the prescribed portion of the detection region comprises a portion of the detection region characterized by said center electrode and said at least one guard electrode being positioned below a center portion of the workpiece during polishing.

10. The apparatus of claim 7, wherein said digital signal converting means still further comprises a means for comparing the mean thickness value and the standard deviation to a prescribed set-point thickness value and standard deviation, said comparing means further providing an indication when the set-point thickness value and standard deviation are exceeded by the mean thickness value and standard deviation, the indication being representative of polishing removal non-uniformity.

11. The apparatus of claim 10, further wherein the prescribed portion of the detection region comprises a portion of the detection region characterized by said center electrode and said at least one guard electrode being positioned below a center portion of the workpiece during polishing.

12. The apparatus of claim 10, wherein said digital signal converting means comprises a computer, the computer further having a display for displaying the mean thickness value and the standard deviation and further for displaying the indication of polishing removal non-uniformity in real-time.

13. The apparatus of claim 12, further wherein the prescribed portion of the detection region comprises a portion of the detection region characterized by said center electrode and said at least one guard electrode being positioned below a center portion of the workpiece during polishing.

14. A polishing apparatus having real-time in-situ thickness monitoring and being especially well suited for reducing the thickness of a dielectric film layer on a surface of a workpiece during polishing with a conductive polishing slurry, said polishing apparatus comprising:

a) an electrically grounded rotatable polishing table, said polishing table receiving the conductive polishing slurry thereon;

b) means for holding the workpiece above and in pressure contact with said polishing table, the surface of the workpiece to be polished being in contact with said polishing table;

c) a center electrode embedded within and electrically isolated from said polishing table, said center electrode electrically contacting the workpiece via the conductive polishing slurry;

d) at least one guard electrode embedded within and electrically isolated from said polishing table, said guard electrode being concentric with and surrounding said center electrode and further electrically contacting the workpiece via the conductive polishing slurry;

e) means for generating a sinusoidal voltage signal, said signal generating means providing an output signal on an output thereof, the output signal having a frequency in the range of 500 to 50,000 hertz and an amplitude of less than one-half volt.;

f) a voltage follower having an input and an output, the voltage follower input being electrically connected to the output of said signal generating means and the voltage follower output being electrically connected to said guard electrode;

g) a current-to-voltage converter having first and second inputs and an output, the first input being electrically connected to said center electrode and the second input being electrically connected to the output of said signal generating means, said current-to-voltage converter for converting a current passing through the center electrode into a voltage signal;

h) a differential amplifier having first and second inputs, the first input being electrically connected to the output of said current-to-voltage converter and the second input being electrically connected to the output of said signal generating means, said differential amplifier further having an output for providing an output voltage representative of the current passing through said center electrode, whereby the amplitude of the differential amplifier output voltage is inversely proportional to the thickness of the film layer of the workpiece being polished during movement of said center electrode and said at least one guard electrode through a detection region; and i) means for controlling polishing of the workpiece in response to a monitored thickness of the film layer of the workpiece being polished, the monitored thickness being derived from the differential amplifier output voltage.

15. The apparatus of claim 14, wherein further comprising:

j) an analog-to-digital converter means for converting the differential amplifier output voltage into a digital signal;

k) means for triggering said analog-to-digital converter to convert the differential amplifier output voltage into digital signals as the workpiece is being polished, said triggering means triggering said analog-to-digital converter when said center electrode and said at least one guard electrode are within a prescribed portion of the detection region; and l) means for converting said digital signals into thickness data values corresponding to the thickness of the polished dielectric film layer; and further wherein the monitored thickness used by said control means is obtained from the thickness data values.

16. The apparatus of claim 15, further wherein the prescribed portion of the detection region comprises a portion of the detection region characterized by said center electrode and said at least one guard electrode being positioned below a center portion of the workpiece during polishing.

17. The apparatus of claim 15, further wherein said digital signal converting means further comprises a means for averaging the thickness data values.

18. The apparatus of claim 17, further wherein the prescribed portion of the detection region comprises a portion of the detection region characterized by said center electrode and said at least one guard electrode being positioned below a center portion of the workpiece during polishing.

19. The apparatus of claim 15, further wherein said digital signal converting means comprises a means for computing a mean thickness value and a standard deviation from thickness data values generated during each individual pass of said center electrode and said at least one guard electrode through the detection region.

20. The apparatus of claim 19, wherein said digital signal converting means still further comprises a means for comparing the mean thickness value and the standard deviation to a prescribed set-point thickness value and standard deviation, said comparing means further providing an indication when the set-point thickness value and standard deviation are exceeded by the mean thickness value and standard deviation, the indication being representative of polishing removal non-uniformity, and still further wherein said control means also controls the polishing operation in response to polishing removal non-uniformity.

21. The apparatus of claim 20, further wherein the prescribed portion of the detection region comprises a portion of the detection region characterized by said center electrode and said at least one guard electrode being positioned below a center portion of the workpiece during polishing.

* * * * *